Patented July 4, 1944

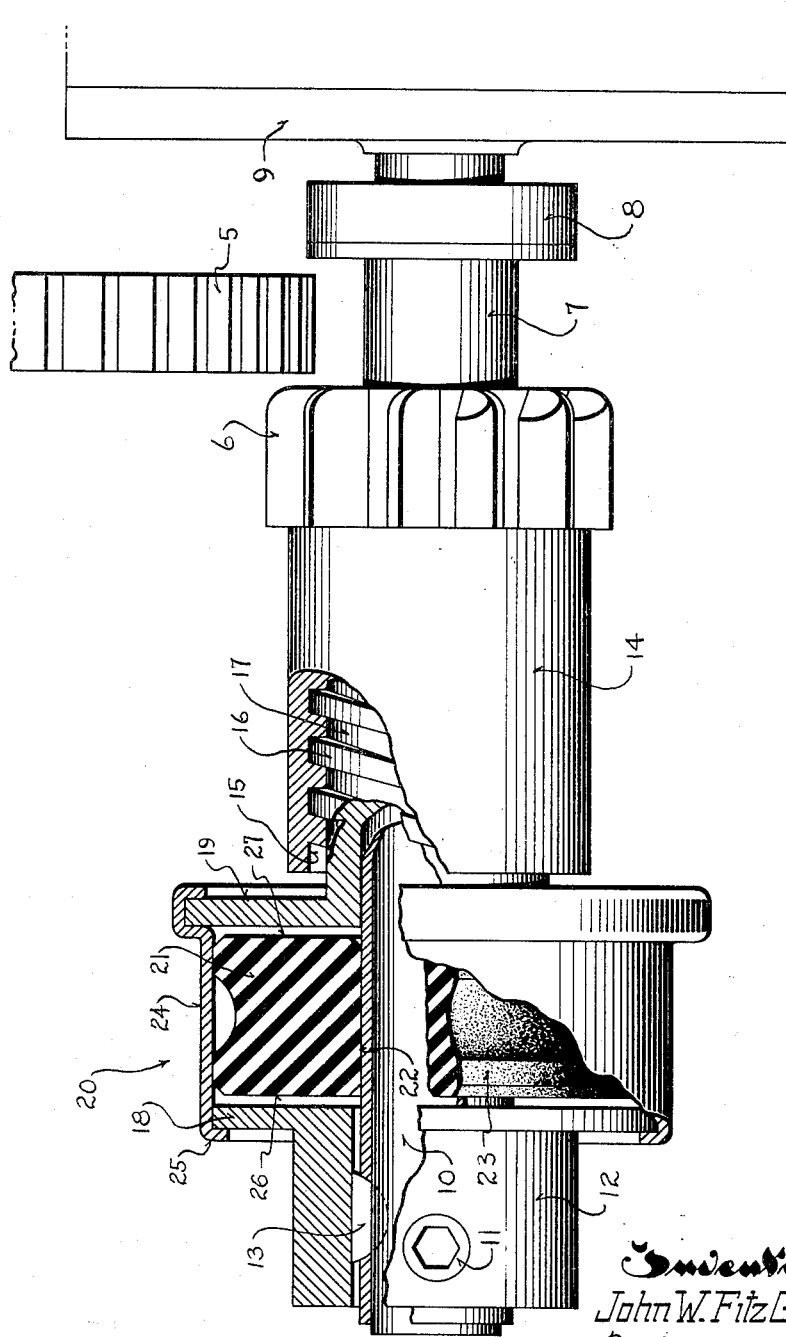

2,352,828

UNITED STATES PATENT OFFICE 2,352,828

ENGINE STARTER

John W. Fitz Gerald, Milwaukee, Wis., assignor to Briggs & Stratton Corporation, Milwaukee, Wis., a corporation of Delaware Application May 3, 1941, Serial No. 391,671

3 Claims. (Cl. 74—7)

This invention relates to engine starters of the type shown in Patent No. 2,201,310, issued to Oscar F. Gottlieb et al., May 21, 1940.

Engine starters of this nature have been found especially advantageous through the use of a novel endwise and torsionally resilient driving connection between the starter shaft and the pinion thereof.

This resilient driving connection is afforded by employing a rubber collar confined between axially spaced abutments on the shaft one of which is movable with respect to the shaft and forms a part of the screw threaded pinion actuator and the other of which is fixed directly to the shaft.

A shell encircling these abutments normally maintains the same against separation and at all times holds the adjacent faces of the abutments in good frictional engagement with the opposite faces of the rubber collar so that torque may be transmitted through the rubber collar upon rotation of the drive shaft.

The abutments therefor cooperate to at all times maintain the rubber collar under a degree of endwise compressive force necessary to establish the initial driving connection between the drive shaft and the pinion actuator.

One of the main functions of the resilient driving connection provided by the rubber collar is to cushion the shock of improper meshing of the gears and to permit the starting motor to take up the load of the engine gradually upon meshing of the pinion with the ring gear of the engine.

In each of these instances, the cessation of the forward motion of the pinion effects axial movement of the pinion actuator in a direction tending to compress the rubber collar axially between its abutment and the fixed abutment on the shaft. Such action further increases the compressive force applied to the rubber collar and improves the driving connection between the shaft and the pinion actuator and consequently the pinion.

It is apparent, however, that since the rubber collar is initially placed under an endwise compressive force to insure sufficient friction for the initial driving connection between the starting shaft and the screw threaded pinion actuator, the cushioning characteristic of the rubber collar at the time the pinion picks up the load of the engine or improperly meshes with the engine ring gear is limited. This is objectionable, as it is obviously desirable to provide maxmum cushioning for the pinion both when it meshes improperly with the engine gear and during the cranking of the engine.

Placing the rubber cushioning member under a degree of endwise compressive force to insure sufficient friction between its opposite faces and the adjacent abutments for initial torque transmission is also objectionable in that it tends to promote setting of the rubber over a period of time. When such a condition occurs the frictional driving connection afforded by the engagement of the abutments with the opposite faces of the rubber cushioning member is practically destroyed during initial rotation of the starter shaft.

It is, therefore, an object of this invention to provide an engine starter of the character described with a rubber cushioning member which functions to transmit torque from the starter shaft to the pinion independently of and without affecting the initial driving connection between the starter shaft and the pinion actuator and so that the rubber cushioning member is free of endwise compressive forces during initial rotation of the shaft and thus may exercise its full cushioning effect during improper meshing of the gears or when the pinion takes up the load of the engine after the gears have been meshed.

Another object of this invention resides in the provision of a rubber cushioning member in an engine starter of the character described which functions to yieldably transmit torque from the starter shaft to the pinion during cranking of the engine by frictional engagement of surfaces thereof normal to the axis of the starter shaft with parts on the pinion actuator and the shaft, and which functions to transmit torque from the shaft to the pinion actuator during initial rotation of the shaft by frictional engagement of other surfaces thereof with other parts on the pinion actuator and the shaft.

More specifically, it is an object of this invention to effect an initial yieldable driving connection between the starter shaft and the pinion actuator of a starter of the character described through frictional engagement of the inner and outer peripheries of a rubber collar with the starter shaft and a portion of the pinion actuator respectively to thereby maintain the rubber collar free of endwise compressive forces during initial torque transmission thereby.

This invention has an another of its objects to improve the resilient driving connection afforded by the rubber collar in engine starters of the character described with a view toward increasing the life of the rubber cushioning member and the gears of the starter and engine.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

The single figure illustrates the improved resilient driving connection of this invention as applied to an engine starter.

Referring now particularly to the accompanying drawing, in which like numerals indicate like parts, the numeral 5 designates an engine ring gear with which a pinion 6 is adapted to be meshed. The pinion 6 is mounted to move longitudinally of a tubular member 7 hereinafter referred to as a stop tube inasmuch as the stop 8 for limiting longitudinal motion of the pinion toward its operative position is mounted on one end of the tube adjacent to the starting motor 9.

The stop tube 7 is adapted to have all of the starter parts mounted thereon to form a unitary starter assembly capable of being quickly assembled and disassembled from the starter shaft. For this purpose, the tube is of a size to slide over the outer free end of the starter drive shaft 10 to be drivingly connected for rotation therewith by means of a set screw 11 passing through the hub of a collar 12 on the end of the tube opposite the pinion stop 8. The set screw 11 cooperates with a key 13 to connect the collar and tube for rotation with the starter drive shaft 10 so that the tube forms substantially a part of the drive shaft.

The pinion 6 which encircles the stop tube between the stop 8 and the collar 12 thereof has a tubular extension or sleeve 14 projecting toward the collar 12. This sleeve 14 is internally threaded as at 15 to mesh with threads 16 formed on the exterior of a pinion actuator 17 freely slidable and rotatable on the stop tube 7.

The adjacent ends of the collar 12 and the pinion actuator 17 are provided with annular flanges or abutments 18 and 19, respectively, the adjacent faces of which lie in planes normal to the axis of the stop tube and the shaft 10.

As is customary, relative rotation between the pinion actuator and the screw threaded sleeve of the pinion effects longitudinal motion of the pinion to and from its operative position engaged with the ring gear of the engine.

With the parts in their positions illustrated in the drawing, the initial rotation of the pinion actuator 17 propels the pinion forwardly toward the ring gear 5 and the pinion stop 8.

Such relative rotation between the pinion actuator and the pinion necessary to propel the pinion to its operative position is afforded by a resilient driving connection generally designated 20 between the starter shaft 10 and the pinion actuator 17.

This driving connection comprises a rubber collar 21 having a bore 22 of a size to tightly frictionally engage the exterior of the stop tube at a point thereon between the flanges or abutments 18 and 19 on the collar 12 and the pinion actuator 17, respectively.

The outer periphery 23 of the rubber collar is encircled by a cylindrical part 24 fixed to the flange 19 of the pinion actuator which part also encircles the flange 18 of the collar 12 and engages behind the flange as at 25 to limit spreading of the flanges or abutments 18 and 19.

The diameter of the rubber collar 21 is such that its outer periphery 23 is tightly frictionally engaged with the inner surface of the cylindrical part 24. As shown, the rubber collar has a width such that its opposite faces 26 and 27 are contiguous to the adjacent faces of the flanges 18 and 19, respectively; that is, the opposite faces of the rubber collar may just barely engage the adjacent faces of the flanges or they may be spaced therefrom as illustrated.

In the inoperative position of the starter, therefore, it will be seen that the rubber collar 21 is absolutely free of any endwise compressive force and that the frictional engagement of its inner and outer peripheries with the stop tube and the pinion actuator part 24 provides an initial torque transmitting connection between the drive shaft 10 and the pinion actuator.

Upon initial rotation of the starter shaft, therefore, with the parts as shown, torque will be yieldingly transmitted to the pinion actuator through the rubber collar 21 and the ensuing relative rotation between the pinion and its actuator effects forward propulsion of the pinion toward the ring gear and its stop 8.

In the event the pinion readily meshes with the ring gear, the forward motion of the pinion will be arrested by the stop 8 and the pinion actuator will be caused to back up along the stop tube as the load of the engine is taken up.

Such motion of the pinion actuator engages the adjacent faces of the flanges 18 and 19 with the opposite faces 26 and 27, respectively, of the rubber collar, and places the rubber collar under axial or endwise compressive force to a degree proportional to the load of the engine.

The rubber collar at this time has all of its exterior surfaces frictionally engaged with the drive and driven parts of the starter and operates to yieldingly transmit torque for cranking the engine entirely without slippage between the drive and driven parts.

Thus it will be seen that the frictional engagement of the inner and outer peripheries of the rubber collar with the stop tube and the pinion actuator part 24 is sufficient to yieldingly transmit torque from the shaft to the pinion actuator under no load conditions, but at the time the pinion is meshed with the ring gear the effectiveness of the torque transmitting connection between the shaft and the pinion actuator is increased through the frictional engagement of the opposite faces of the rubber collar with the adjacent faces of the flanges 18 and 19 to provide a load carrying endwise and torsionally resilient driving connection between the shaft and the pinion actuator.

It is also to be noted that the full axial resiliency of the rubber collar is available for cushioning purposes as the load of the engine is picked up by the pinion, a feature which prolongs the life of the gears and generally improves the starting operation; and that the transmission of cranking torque to the pinion is accomplished by a driving connection entirely independent of the initial driving connection between the shaft and the pinion actuator so as not to endanger the effectiveness of the initial frictional driving connection between the abutments over long periods of time.

While it has been seen that the rubber collar 21 acts as a cushion at the time the pinion picks up the load of the engine upon meshing of the gears it will also be apparent that the rubber collar 21 acts to cushion the pinion during improper meshing of the gears.

In such an event the cessation of forward longitudinal motion of the pinion in response to initial rotation of the pinion actuator through the driving connection afforded by the rubber collar causes the pinion actuator to move rearwardly toward the collar 12 to bring its flange 19 into yielding engagement with the adjacent face of the rubber collar.

In the event the gears jam during such improper meshing, the endwise compressive force applied to the rubber collar will increase as the pinion actuator moves further rearwardly until such time as the increased friction afforded by the engagement between the opposite faces of the rubber collar and the adjacent faces of the flanges 18 and 19 overcomes friction at the gears. The pinion will then be rotated the slight amount necessary to effect meshing of the gears.

Inasmuch as the rubber collar provides an initial yielding driving connection between the shaft and the pinion actuator through the frictional engagement of its inner and outer peripheries with the stop tube and the cylindrical part 24 of the pinion actuator alone, it is clear that the rubber collar remains free of endwise compressive forces except during improper meshing of the gears or when the pinion takes up the load of the engine.

The life of the rubber collar 21 is thus prolonged inasmuch as the complete absence of endwise compressive forces on the rubber collar for initial torque transmission assures against any tendency of the rubber to set over periods of time.

From the foregoing description taken in connection with the accompanying drawing, it will be readily apparent that the improved endwise and torsionally resilient driving connection between the starting shaft and the pinion of the starter of this invention materially improves the operation of the starter and prolongs the life of the rubber cushioning member as well as the pinion thereof.

What I claim as my invention is:

1. In an engine starter of the type wherein a pinion is automatically propelled forwardly along a drive shaft toward an operative position meshing with an engine ring gear, an endwise and torsionally resilient driving connection through which torque is transmitted to the pinion comprising: axially spaced driving and driven abutments relatively axially movable toward each other as a result of any interference with forward movement of the pinion toward its operative position and as the load of the engine is picked up by the starter; a rubber element in the space between said abutments; the normal axial spacing of the abutments when the starter is at rest being such that the rubber element therebetween is substantially free from the abutments and not subjected to axially directed compressive forces, relative axial motion of the abutments toward each other during operation of the starter establishing a load carrying torque transmitting connection as the result of frictional engagement of the abutments with the ends of the rubber element; and cooperating radially spaced parts one fixed with respect to each of said abutments at all times frictionally engaging radially spaced inner and outer surfaces on the rubber element substantially normal to the ends thereof to establish an initial torque transmitting connection between said abutments independent of said load carrying connection therebetween.

2. In an engine starter of the type wherein a pinion is automatically propelled forwardly along a drive shaft toward an operative position meshing with an engine ring gear, an endwise and torsionally resilient driving connection through which torque is transmitted to the pinion, comprising: axially spaced driving and driven abutments substantially normal to the starter axis and relatively axially movable toward each other as a result of any interference with forward movement of the pinion toward its operative position and as the load of the engine is picked up by the starter; a rubber element in the space between said abutments; cooperating radially spaced parts, one fixed with respect to each of said abutments, frictionally engaging radially spaced inner and outer cylindrical surfaces on the rubber element substantially normal to the ends thereof whereby an initial torque transmitting connection between said abutments is at all times maintained regardless of the relationship between the ends of the rubber element and the adjacent abutments; the ends of said rubber element being adapted to have frictional engagement with said abutments to provide a load carrying torque transmitting connection from one abutment to the other through said rubber element; and said rubber element having an axial dimension such that its opposite ends normally lie close to said abutments but do not have a torque transmitting frictional engagement therewith so that axial movement of the abutments toward each other is required for the establishment of the load carrying torque transmitting connection between the abutments and the rubber element.

3. In an engine starter of the type wherein a pinion is automatically propelled forwardly along a drive shaft toward an operative position meshing with an engine ring gear upon relative rotation between it and a pinion actuator loose on the shaft and having a screw threaded connection with the pinion, an endwise and torsionally resilient driving connection between the drive shaft and said pinion actuator, comprising: an abutment on the pinion actuator; an abutment fixed on the shaft and axially spaced from said pinion actuator abutment; a rubber collar surrounding the shaft between said abutments, said collar having an axial dimension such that the abutments when normally spaced do not place the collar under endwise compression; radially spaced telescoping cylindrical walls one fixed with respect to each of said abutments at all times frictionally engaging the inner and outer peripheral surfaces of the rubber collar to provide an initial torque transmitting connection between the shaft and the pinion actuator through said collar which torque transmitting connection is independent of the relative axial spacing of said abutments; and said pinion actuator being movable axially along the shaft in a direction to move its abutment toward the abutment on the shaft as a result of any interference with forward propulsion of the pinion toward its operative position and as the load of the engine is picked up by the starter so as to establish frictional torque transmitting connections between the abutments and the ends of the rubber collar.

JOHN W. FITZ GERALD.